United States Patent
Palat et al.

(10) Patent No.: US 10,966,274 B2
(45) Date of Patent: Mar. 30, 2021

(54) RRC COORDINATION BETWEEN A PLURALITY OF NODES

(71) Applicant: Apple Inc., Cupertino, CA (US)

(72) Inventors: Sudeep Palat, Cheltenham (GB); Yujian Zhang, Beijing (CN); Richard Burbidge, Shrivenham (GB); Ahmed Ibrahim, Munich (DE); Youn Hyoung Heo, Seoul (KR); Ingolf Karls, Feldkirchen (DE); Yang Yang, Mannheim (DE); Miltiadis Filippou, Munich (DE); Michael Faerber, Wolfratshausen (DE)

(73) Assignee: APPLE INC., Cupertino, CA (US)

( * ) Notice: Subject to any disclaimer, the term of this patent is extended or adjusted under 35 U.S.C. 154(b) by 1 day.

(21) Appl. No.: 16/316,489

(22) PCT Filed: Aug. 8, 2017

(86) PCT No.: PCT/US2017/045949
§ 371 (c)(1),
(2) Date: Jan. 9, 2019

(87) PCT Pub. No.: WO2018/031573
PCT Pub. Date: Feb. 15, 2018

(65) Prior Publication Data
US 2019/0297662 A1 Sep. 26, 2019

Related U.S. Application Data

(60) Provisional application No. 62/374,631, filed on Aug. 12, 2016.

(51) Int. Cl.
*H04W 76/27* (2018.01)
*H04W 76/15* (2018.01)
*H04W 92/20* (2009.01)

(52) U.S. Cl.
CPC .......... *H04W 76/27* (2018.02); *H04W 76/15* (2018.02); *H04W 92/20* (2013.01)

(58) Field of Classification Search
CPC ............................. H04W 76/27; H04W 76/15
See application file for complete search history.

(56) References Cited

U.S. PATENT DOCUMENTS

| | | | | |
|---|---|---|---|---|
| 2016/0028585 A1* | 1/2016 | Wager | .................... | H04B 7/024 455/452.2 |
| 2016/0057687 A1* | 2/2016 | Horn | .................... | H04W 24/10 370/331 |

(Continued)

OTHER PUBLICATIONS

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Dverall description; Stage 2 (Release 12)", V12.10.0, Jun. 2016, 254 pages.

(Continued)

*Primary Examiner* — Jefffrey M Rutkowski
*Assistant Examiner* — Chae S Lee
(74) *Attorney, Agent, or Firm* — Stoel Rives LLP

(57) ABSTRACT

Coordination of RRC configurations between an LTE NB and an NR NB in dual connectivity with a UE are performed using an RRC container that includes shared or coordinated parameters. For example, an NR NB determines to alter a configuration of a UE. The NR NB transmits a coordinated RRC container with coordinated UE parameters to an LTE NB and transmits a UE parameter RRC container to the LTE NB. The LTE NB evaluates the coordinated container for compliance with the UE capability. If satisfied, the LTE NB can send both containers (in a single RRC message or multiple RRC messages) to the UE.

18 Claims, 15 Drawing Sheets

(56) References Cited

U.S. PATENT DOCUMENTS

2017/0222876 A1* 8/2017 Van Der Velde ............................ H04W 12/0401
2017/0331670 A1* 11/2017 Parkvall .............. H04L 41/0816
2019/0159274 A1* 5/2019 Hong ................ H04W 72/0413

OTHER PUBLICATIONS

Ericsson, "Overview of RRC architecture options for the LTE-NR tight interworking", R2-164005, 3GPP TSG-RAN WG2 #94, Nanjing, China, Agenda Item 9.4.1.2, May 23-27, 2016, 6 pages.
Intel Corporation, "RRC aspects for LTW-NR interworking", R2-163587, 3GPP TSG-RAN WG2 Meeting #94, Nanjing, China, Agenda Item 9.4.3.1, May 23-27, 2016, 5 pages.
Intel Corporation (Rapporteur), "Report of email discussion: [94#39][NR] C plane aspects for tight intertworking", R2-165012, 3GPP TSG-RAN WG2 Meeting #95, Gothenburg, Sweden, Agenda Item 9.4.3.3, Aug. 22-26, 2016, 38 pages.
ITRI, "UE Capabilities Issues for tight interworking between NR and LTE", R2-163791, 3GPP TSG-RAN WG2 Meeting #94, Nanjing, China, Agenda Item 9.4.3.1, May 23-27, 2016, 3 pages.
PCT/US2017/045949, International Search Report and Written Opinion, dated Jan. 16, 2018, 24 pages.

* cited by examiner

RRC COORDINATION BETWEEN A PLURALITY OF NODES

RELATED APPLICATIONS

This application is a national stage filing under 35 U.S.C. § 371 of International Patent Application No. PCT/US2017/045949, filed Aug. 8, 2017, which is a non-provisional of U.S. Provisional Patent Application No. 62/374,631, filed Aug. 12, 2016, each of which is incorporated by reference herein in its entirety.

TECHNICAL FIELD

The present disclosure relates to radio resource control (RRC) coordination between a plurality of nodes. In particular, the present disclosure relates to RRC coordination between a long term evolution evolved node B (LTE eNB) and a new radio node B (NR NB).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node (gNB or new radio node B (NR NB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Figure 1:
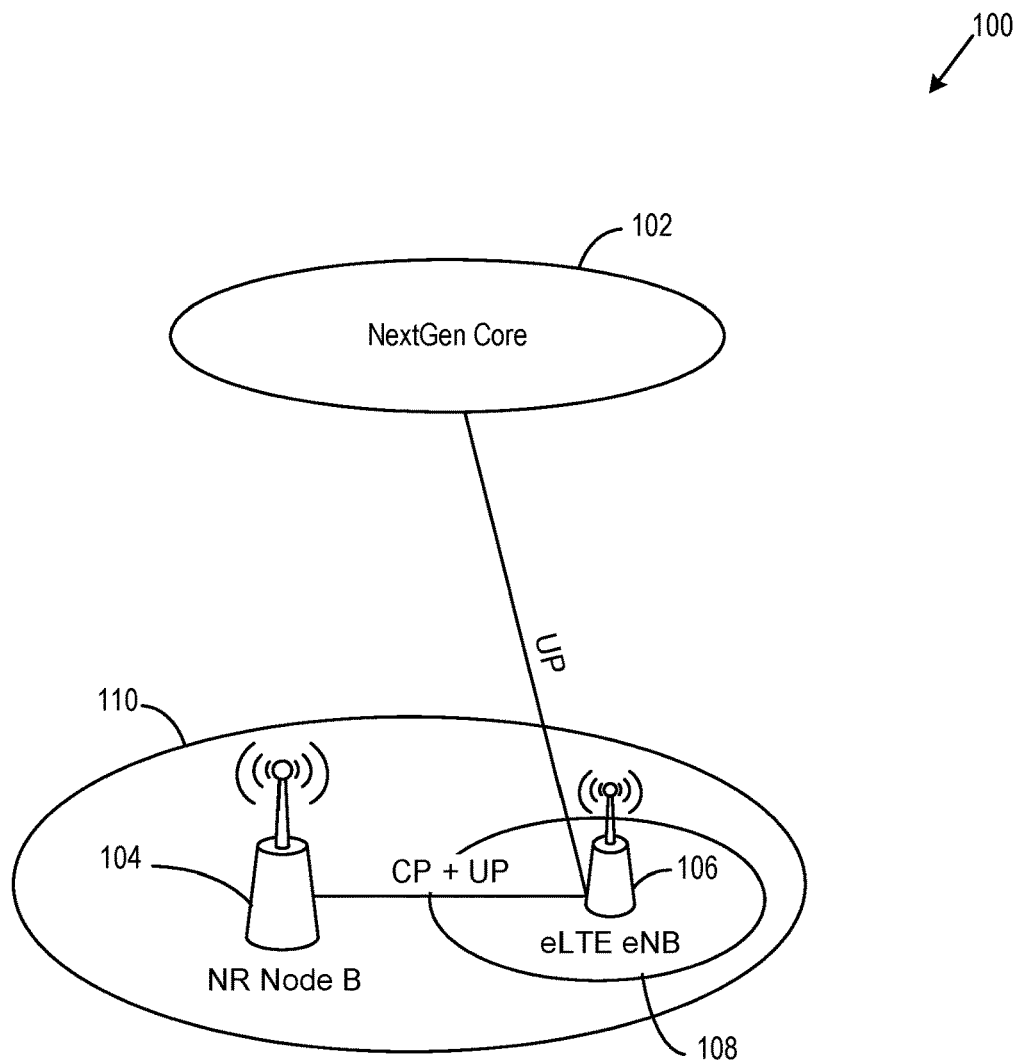
FIG. 1 illustrates an interaction between a next generation core and a plurality of nodes according to some embodiments.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable coordination of RRC configurations between an LTE NB and an NR NB in dual connectivity with a UE by use of an RRC container that includes shared or coordinated parameters. For example, an NR NB determines to alter a configuration of a UE. The NR NB transmits a coordinated RRC container with coordinated UE parameters to an LTE NB and a UE parameter RRC container to the LTE NB. The LTE NB evaluates the coordinated container for compliance with the UE capability. If satisfied, the LTE NB can send both containers (in a single RRC message or multiple RRC messages) to the UE.

A number of embodiments describe a tight interworking between nodes (e.g., evolved node B (eNodeB) and new radio node B (NR NB)). An eNodeB and an NR NB can both provide configuration information to the user equipment (UE) of their respective protocol stack including the RRC. As used herein, configuration information for the protocol stack can include configuration information for any layer and/or protocol corresponding to the protocol stack. As such, protocol stack configurations can include configurations for the layers and/or protocols corresponding to the protocol stack. While some of the examples described herein are described in terms of the RRC, the examples can also be provided in terms of the protocol stack.

Some capabilities of the UE may be shared by an eNodeB and an NR NB. As used herein, UE capabilities describe hardware characteristics of the UE and/or software characteristics of the UE. For example, UE characteristics can include supported bands, transmission time interval (TTI), channel coding, DL-SCH soft channel bits, power allocation, MIMO capability, and maximum number of header compression context sessions, as a non-exhaustive list. An eNodeB and an NR NB can share UE capabilities if both the eNodeB and the NR NB utilize, activate, control, and/or otherwise interact with the UE capabilities. An RRC configuration of the protocol stack of the eNodeB and the protocol stack of the NR NB should not exceed the total UE capabilities. To achieve this, the eNodeB and the NR NB can coordinate their respective protocol stacks to ensure that the configurations provided to the UE do not exceed the UE capabilities.

For example, an eNodeB configures its protocol stack and/or the RRC using long-term evolution (LTE) configurations. The NR NB configures its protocol stack and/or the RRC using new radio (NR) configurations. To coordinate protocol stack configurations, the eNodeB and the NR NB are each configured to understand the other node's configurations and implement the protocol stack and/or the RRC of the other node. That is, the eNodeB and the NR NB each implement the full RRC of the other node and/or they are upgraded together every time a feature is introduced in one of nodes.

Some of the UE capabilities may be split. That is, some of the UE capabilities may be allocated to one of the eNodeB or the NR NB. For example, the eNodeB can provide protocol stack configurations to the UE to configure a first plurality of capabilities of the UE, and the NR NB can provide protocol stack configurations to the UE to configure a second plurality of capabilities of the UE, the first plurality of capabilities and the second plurality of capabilities being different capabilities. This split of the capabilities can be defined by either of the eNodeB and the NR NB.

In a number of embodiments, an additional RRC container (e.g., coordination container) is included between the eNodeB and NR NB for fields that require coordination. The coordination container can be separate from a UE configuration container carrying the RRC configurations provided to the UE. In some examples, the information in the coordination container is a duplicate of the information in the UE configuration container. In another embodiment, the full RRC configurations are split between the coordination container and the UE configuration container. That is, both containers are sent to the UE, and the UE puts together the full configuration from information in both containers.

In yet another embodiment, one of the eNodeB and the NR NB combines the information from the two containers and sends a single container to the UE. The eNodeB and/or the NR NB can verify the information in the containers to ensure compliance of the configurations to the UE capability. If any of the configurations are not valid or compliant with the UE capabilities, the receiving node can reject the configuration request to prevent the configuration request from being provided to the UE.

In the examples where the configurations are not valid or compliant with the UE capabilities, the nodes may negotiate protocol stack configurations. The protocol stack configurations can be negotiated by, for example, providing a cause identifier for non-valid or compliant configurations. The cause identifier can identify why the configuration is non-valid or compliant.

The eNodeB and the NR NB can successfully accept a protocol stack configuration if the eNodeB and the NR NB understand the information in the containers. If the eNodeB and the NR NB do not understand any of the fields of the protocol stack configuration, then the random access network (RAN) implementations are out of sync with respect to what fields of the protocol stack configuration need to be coordinated, and this can result in a wrong configuration to the UE. In this case of being out of sync or lacking understanding of a field, the base station can reject the configuration or split with an indication of the problem (e.g., a configuration field error).

The UE capabilities can be split before the protocol stack configurations are coordinated between the eNodeB and the NR NB. In some examples, the UE capabilities can be split after the protocol stack configurations are coordinated between the eNodeB and the NR NB. These UE capabilities can be allocated by either of the eNodeB and the NR NB and sent to the other node using containers. The coordination container can be part of the UE configuration container or separate from the UE configuration container.

Such coordination allows the NR NB to provide the protocol stack configurations that do not require coordination directly to the UE without having to send the protocol stack configurations to the eNodeB. Providing protocol stacks configurations directly to the UE can expedite delivery of the protocol stack configurations. In some examples, protocol stack configurations that are coordinated are provided from one node to the other. Even then, it is sufficient to provide just the coordination container with coordination parameters to the eNodeB, for example. The NR NB can still configure the UE directly.

As previously described, it is also possible to coordinate the protocol stack configurations in advance. That is, if the NR NB is scheduled to or has the capability to configure some protocol stack configurations, then the NR NB can coordinate the protocol stack configurations ahead of providing the container to the UE. Then, when the NR NB actually configures the UE protocol stack, the NR NB can do so directly without involving the eNodeB.

The benefit of providing two containers with complementary information to the UE is that it might be easier for the UE to process the protocol stack configurations. Internal to the UE, it will ease implementations of the protocol stack configurations, as the UE knows which parameters require coordination and handles the coordination of this small set of parameters rather than the full protocol stack configurations.

Examples of UE capabilities that can be coordinated are shown in Table 1.

TABLE 1

UE Capability Coordination

| Category | Capability | Comment for LTE-NR Interworkinq |
|---|---|---|
| RF | supportedBandCombination | Due to the potential RF sharing between LTE and NR, some coordination is needed. Supported band combinations can be provided. |
| Physical Layer | Maximum number of DL-SCH/UL-SCH transportblock bits received within a TTI | Considering the potential differences between LTE and NR (e.g., TTI, channel coding), it is not clear yet if the capabilities will need to be shared between LTE and NR. |
| | Total number of DL-SCH soft channel bits | This is related to how LTE and NR are implemented on the UE side, i.e., whether receiver buffer is shared. |
| | p-MeNB and p-SeNB | This is related to the power allocation in uplink. Some form of sharing of the total Tx power constraint between LTE and NR can be expected. The second level detail is how power is distributed between LTE and NR. |
| | supportedMIMO-CapabilityDL(UL)-r10 | This is related to the maximum number of spatial multiplexing layers in DL/UL. Considering the potential differences between LTE and NR (e.g., MIMO schemes and TTI), it is expected that the capabilities will not be shared between LTE and NR. |
| PDCP | maxNumberROHC-ContextSessions | This is related to the maximum number of header compression context sessions supported by the UE. This depends on UE implementation 2. Coordination between LTE and NR can be expected. |

Some example UE capabilities that can be coordinated include a supported band combination capability, a maximum number of DL bits received within a transmission time interval (TTI) capability, a total number of downlink shared channel (DL-SCH) soft channel bits capability, a master NB (p-MeNB) capability, a secondary NB (p-SeNB) capability, a supported multiple input multiple output (MIMO) capability, and a maximum number of robust header compression (ROHC) context sessions capability, among other. The supported band combination capability can be part of a radio frequency (RF) category. The supported band combination capability can be coordinated due to the potential RF sharing between the eNodeB and the NR NB.

The maximum number of DL bits received within a TTI capability can be coordinated due to the TTI and channel coding schemes utilized by the eNodeB and the NR NB. The maximum number of DL bits received can be part of the physical layer. A total number of DL-SCH soft channel bits capability can also be part of the physical layer and can be coordinated due to the option of the receiver buffer of the eNodeB and the NR NB being shared. The p-MeNB capability and the p-SeNB capability can also be part of the physical layer and can be coordinated due to the power allocation in uplink between the eNodeB and the NR NB. The total transmit (Tx) power can be shared between the eNodeB and the NR NB. Also, power can be distributed between the eNodeB and the NR NB.

The supported MIMO capability is part of the physical layer and can be coordinated due to the potential differences in MIMO schemes and TTI of the eNodeB and the NR NB. Furthermore, the maximum number of spatial multiplexing layers in DL and UL can be different between the eNodeB and the NR NB. The maximum number of ROHC context sessions capability can be part of the packet data convergence protocol (PDCP). The maximum number of ROHC context sessions capability can be coordinated due to the maximum number of header compression context sessions supported by the UE.

As described herein, the eNodeB is designated an MeNB, and the NR NB is designated an SeNB. In other examples, the eNodeB can be designated an MeNB, and the NR NB can be designated an MeNB.

In some embodiments, the protocol stack configurations are provided from one node to another node. For example, the protocol stacks configurations are provided from the NR NB (e.g., SeNB) to the eNodeB (e.g., MeNB). In other embodiments, the protocol stack configurations are mutually exchanged between the SeNB and the MeNB. In the embodiments, without providing a node with the other node's protocol stack configurations, it is not possible for the node to ensure that its protocol stack configuration does not violate the other node's protocol stack configuration. For example, the SeNB uses the MeNB configuration to ensure that its configuration is compatible with the UE. The MeNB uses the SeNB configuration to ensure that its configuration is compatible with the UE. The container can be defined in LTE RRC for LTE configuration and in NR RRC for NR configuration to be exchanged between the network nodes.

FIG. 1 shows an interaction between a next generation core and a plurality of nodes. An new radio node B (NR NB) 104 includes NR NB cellular coverage 110 and couples to an eLTE eNB 106 (or enhanced long term evolution enhanced node B, sometimes also referred to as an LTE eNB) that includes eLTE eNB cellular coverage 108. In the embodiment shown, the eLTE eNB serves as the link with the next generation core network (NextGen Core) 102. Depending on the embodiment, the NR NB 104 can serve as a link to the NexGen Core 102 for eLTE eNB 106.

FIGS. 2-7 are communication flow diagrams illustrating coordination of UE configuration between an LTE eNB and an NR NB in an MeNB and SeNB relationship with the UE. The systems can include a tight inter-working 222, 322, 422, 522, 622, 722 in which LTE eNB or NR NB can communicate on behalf of the other network nodes (e.g., UE, LTE eNB and/or NR NB) with the NextGen Core.

Figure 2:
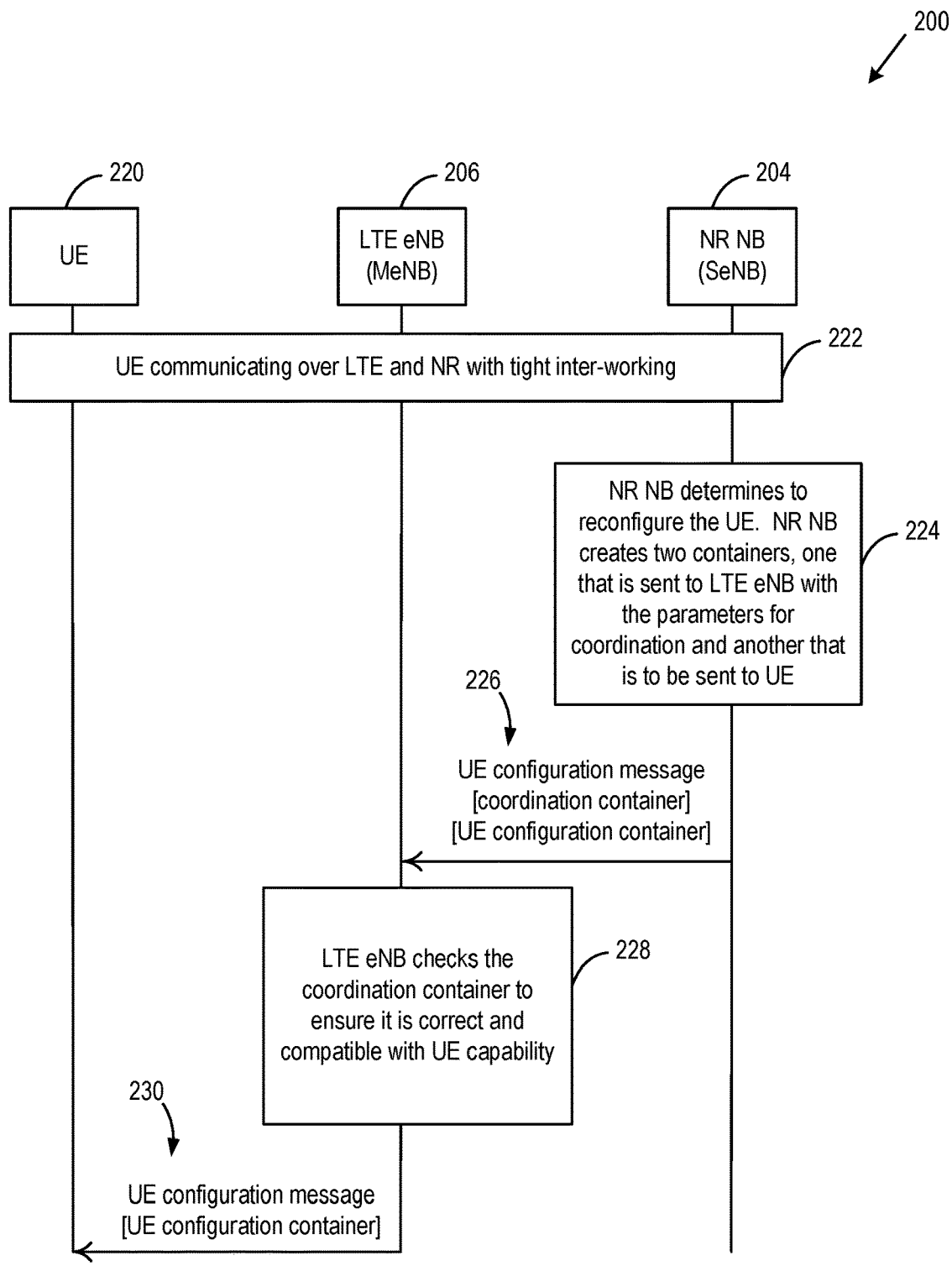
FIG. 2 is a communication flow diagram illustrating an RRC configuration coordination by an NR NB as SeNB and an LTE eNB as MeNB according to some embodiments.

FIG. 2 is a communication flow diagram illustrating an RRC configuration coordination 200 by an NR NB 204 as SeNB and an LTE eNB 206 as MeNB. In an embodiment, when the NR NB 204 configures a UE 220, it generates two containers, in block 224. One container includes parameters for coordination and another container includes parameters for the UE 220. The NR NB 204 then sends both to the LTE eNB 206, in block 226. The LTE eNB 206 then checks the coordination container to verify if the configuration is compatible with the UE 220, in block 228. If so, the LTE eNB 206 forwards the other container with the UE configuration to the UE 220, in block 230. Note that the same description can be applied when the NR NB is the MeNB, as shown in FIG. 3.

Figure 3:
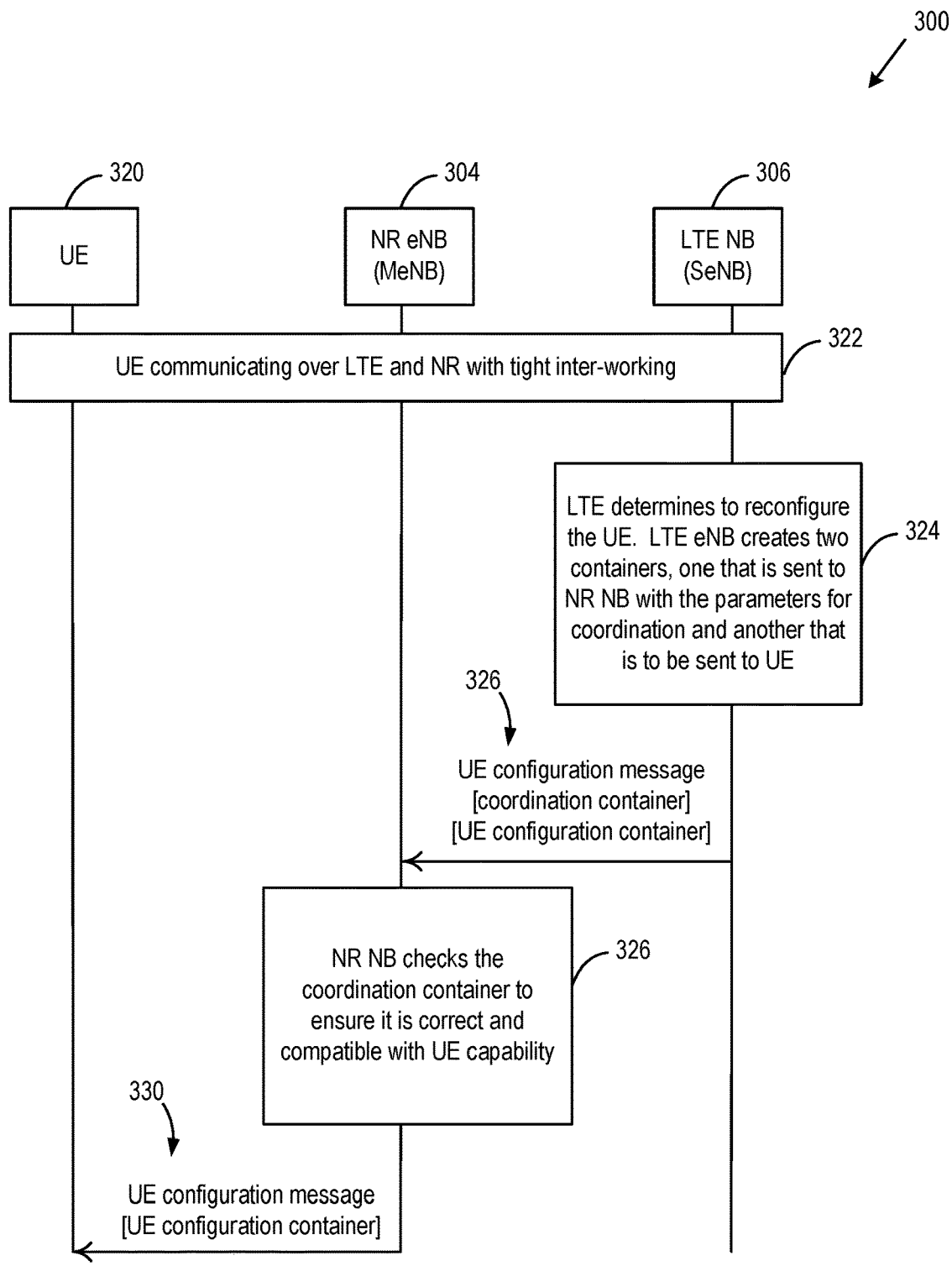
FIG. 3 is a communication flow diagram illustrating an RRC configuration coordination by an LTE eNB as secondary eNB (SeNB) and a new radio node B (NR NB) as master eNB (MeNB) according to some embodiments.

FIG. 3 is a communication flow diagram illustrating an RRC configuration coordination 300 by an LTE eNB 306 as SeNB and an NR NB 304 as MeNB. In an embodiment, when the LTE eNB 306 configures a UE 320, it generates two containers, in block 324. One container includes parameters for coordination and another container includes parameters for the UE 320. The LTE eNB 306 then sends both to the NR NB 304, in block 326. The NR NB 304 then checks the coordination container to verify if the configuration is compatible with the UE 320, in block 326. If so, the NR NB 304 forwards the other container with the UE configuration to the UE 320, in block 230.

Figure 4:
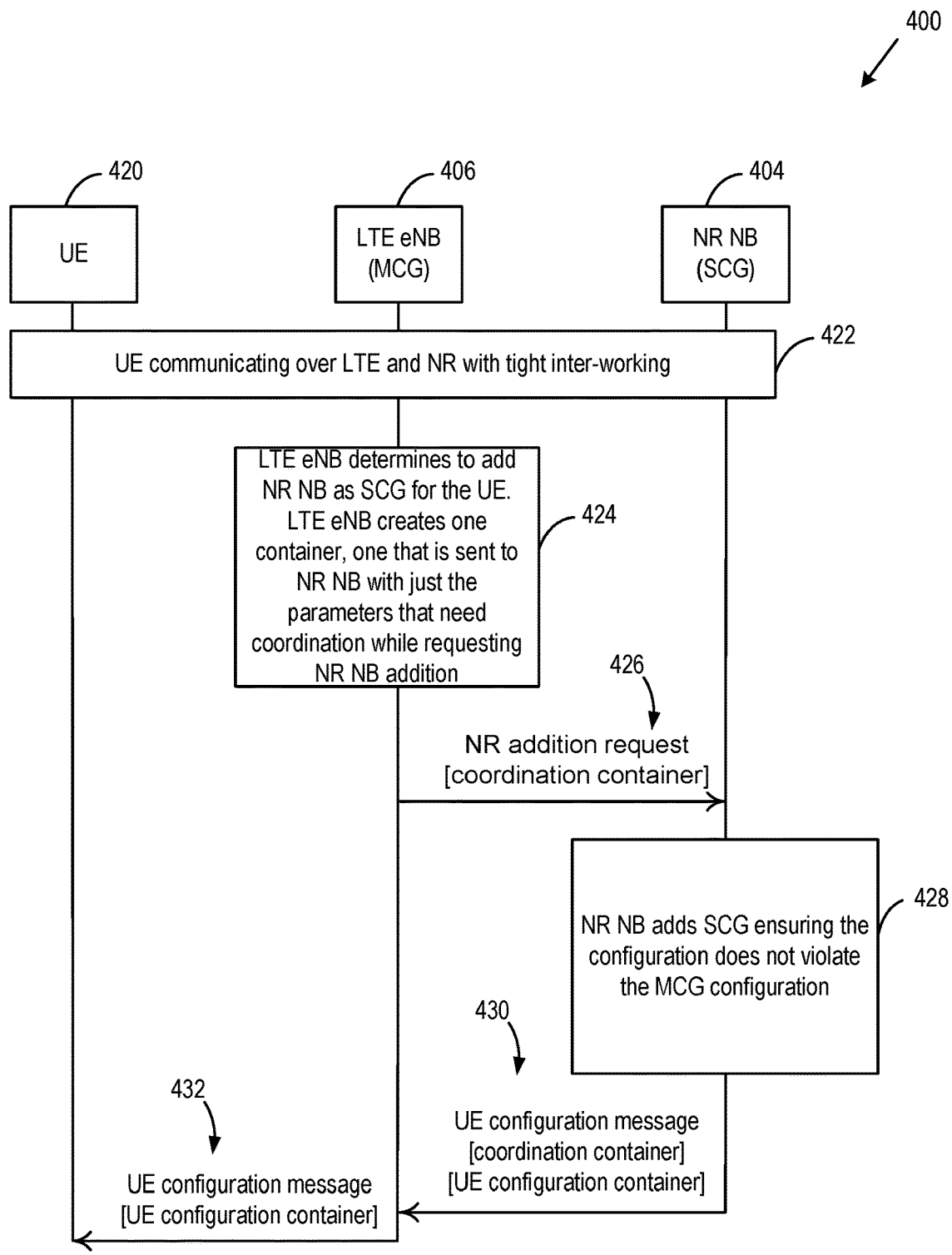
FIG. 4 is a communication flow diagram illustrating an RRC configuration coordination by an LTE eNB as a master cell group (MCG) and an NR NB as a secondary cell group (SCG) according to some embodiments.

FIG. 4 is a communication flow diagram illustrating an RRC configuration coordination 400 by an LTE eNB 406 as a master cell group (MCG) and an NR NB 404 as a secondary cell group (SCG). In block 424, the LTE eNB 406 determines to add the NR NB 404 as an SCG. The LTE eNB 406 creates one container that is sent to the NR NB 404 with parameters for coordination in conjunction with the NR NB addition. In block 426, the NR addition request and coordination container are transmitted to the NR NB 404. In block 428, the NR NB 404 adds the SCG and ensures the configuration does not violate the MCG configuration. In block 430, the NR NB 404 sends a UE configuration message 430 to the LTE eNB 406 that includes a coordination container (for the LTE eNB 406) and a UE configuration container. In block 432, the LTE eNB 406 transmits to a UE 420 a UE configuration message and the UE configuration container from the NR NB 404. Mutual exchange of coordination containers can also be used during an SCG change.

Figure 5:
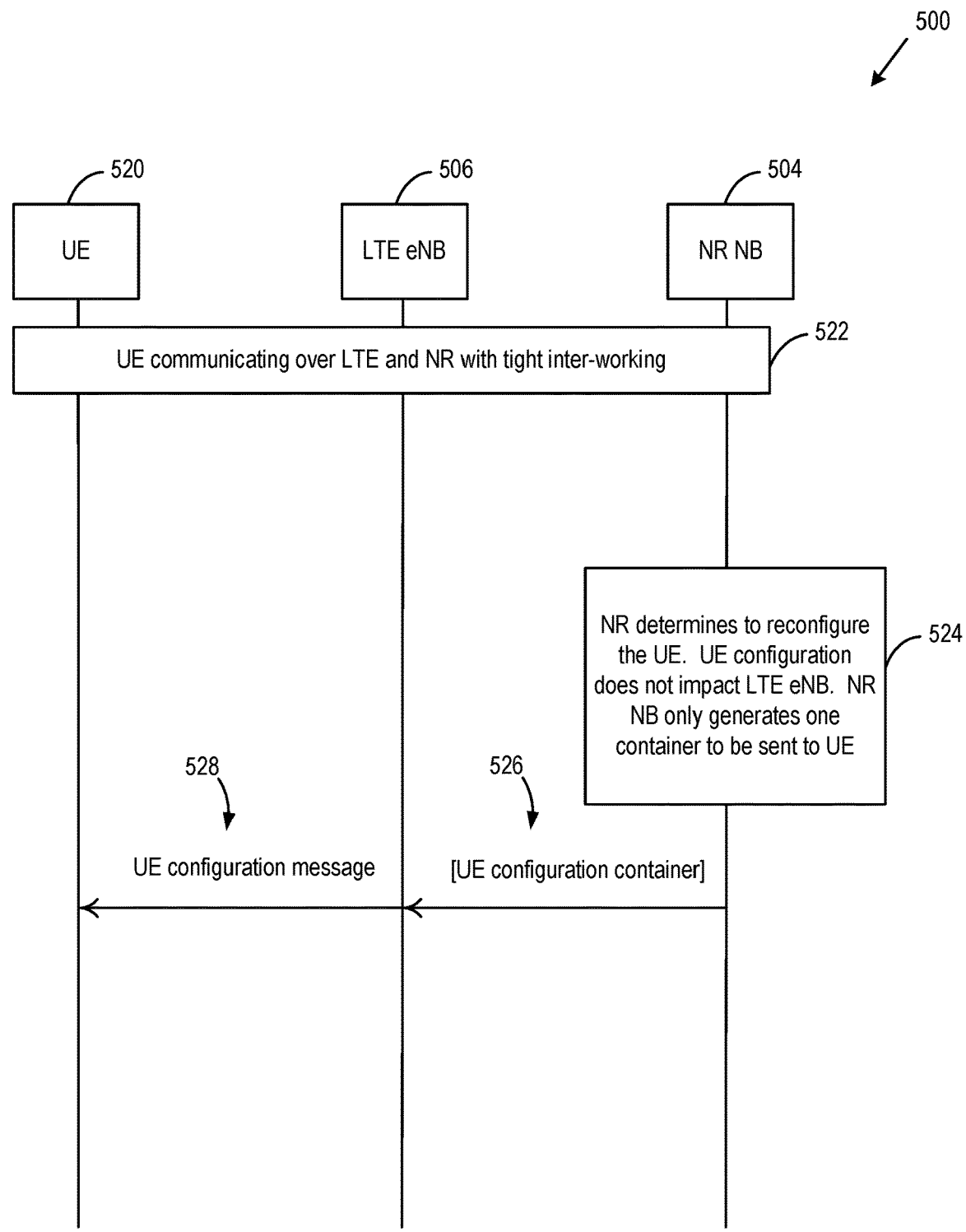
FIG. 5 is a communication flow diagram illustrating an RRC configuration coordination by an LTE eNB as an MCG and an NR NB as an SCG according to some embodiments.

FIG. 5 is a communication flow diagram illustrating an RRC configuration coordination 500 by an LTE eNB 506 as an MCG and an NR NB 504 as an SCG. The NR NB 504 determines to reconfigure a UE 520, in block 524. If there is not a configuration that needs to be verified by the LTE eNB 506, the NR NB 504 sends one container that is to be sent to the UE 520, in block 526. No specific action is needed in the LTE eNB 506, and the UE configuration message is forwarded, in block 528. Note that in other embodiments, it is also possible to send the UE configuration directly from the NR NB 504 to the UE 520 over NR radio.

Figure 6:
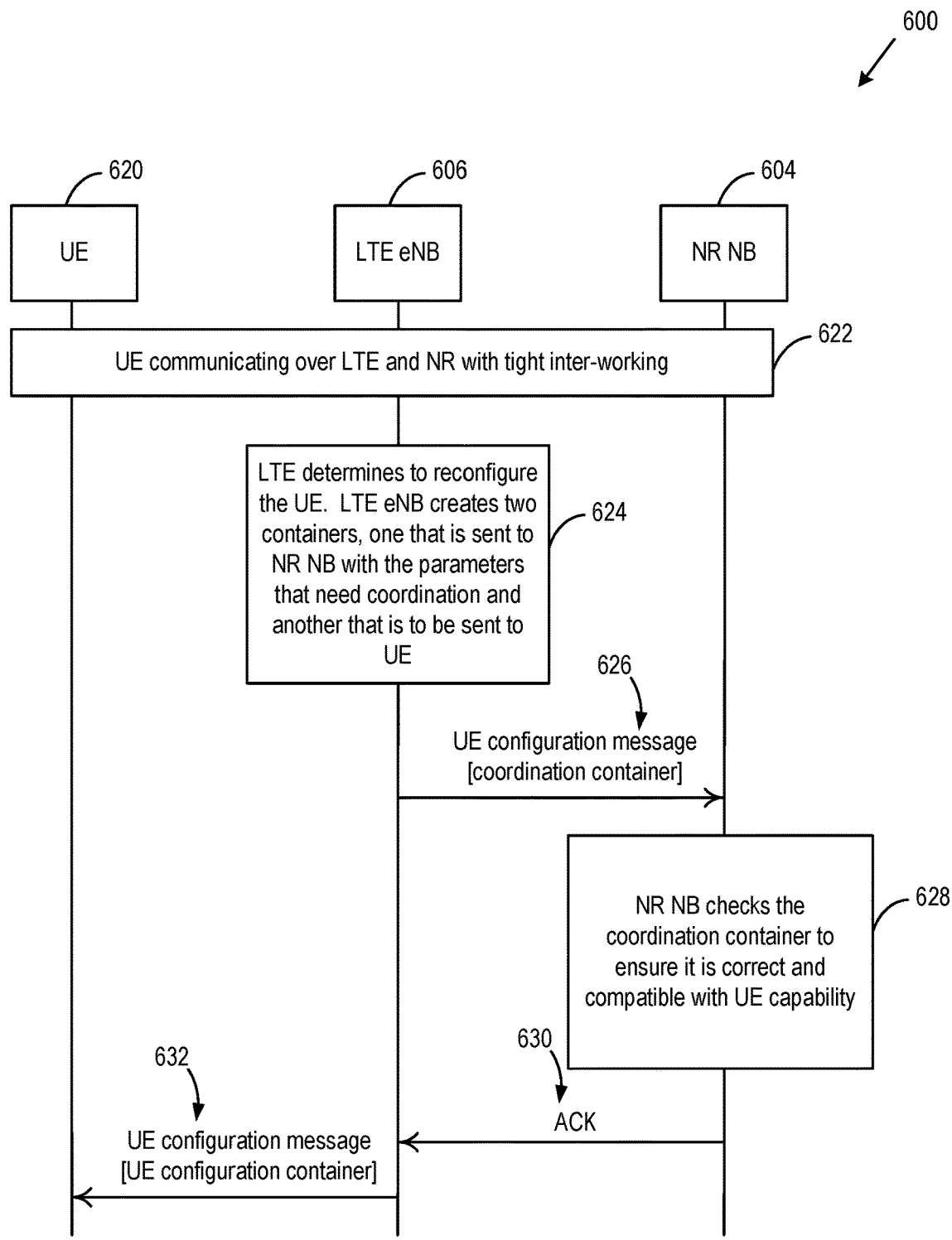
FIG. 6 is a communication flow diagram illustrating successful RRC configuration coordination by an LTE eNB and NR NB according to some embodiments.

FIG. 6 is a communication flow diagram illustrating a successful RRC configuration coordination 600 by an LTE eNB 606 and an NR NB 604. When the LTE eNB 606 determines to reconfigure a UE 620 with parameters that need coordination, it provides a container with those parameters to the NR NB 604 as shown in FIG. 6. In block 624, the LTE eNB 606 determines to reconfigure the UE 620. The LTE eNB 606 creates two containers: a coordination container for the NR NB 604 with coordination parameters, and a UE container for the UE 620. In block 626, the LTE eNB 606 transmits the UE configuration message and the coordination container to the NR NB 604. In block 628, the NR NB 604 verifies the coordination container to ensure it is correct and compatible with the UE capability. In block 630, the NR NB 604 transmits an ACK to the LTE eNB 606. In block 632, the LTE eNB 606 transmits a UE configuration message and UE configuration container.

As part of checks, an LTE eNB or NR NB also ensures that it can understand all of the fields included in the container, as shown in FIG. 6. If it cannot understand/comprehend at least one of the fields, it rejects the configuration as shown in if FIG. 7. This indicates there is a mismatch in the LTE and NR capabilities for the parameters that need coordination.

Figure 7:
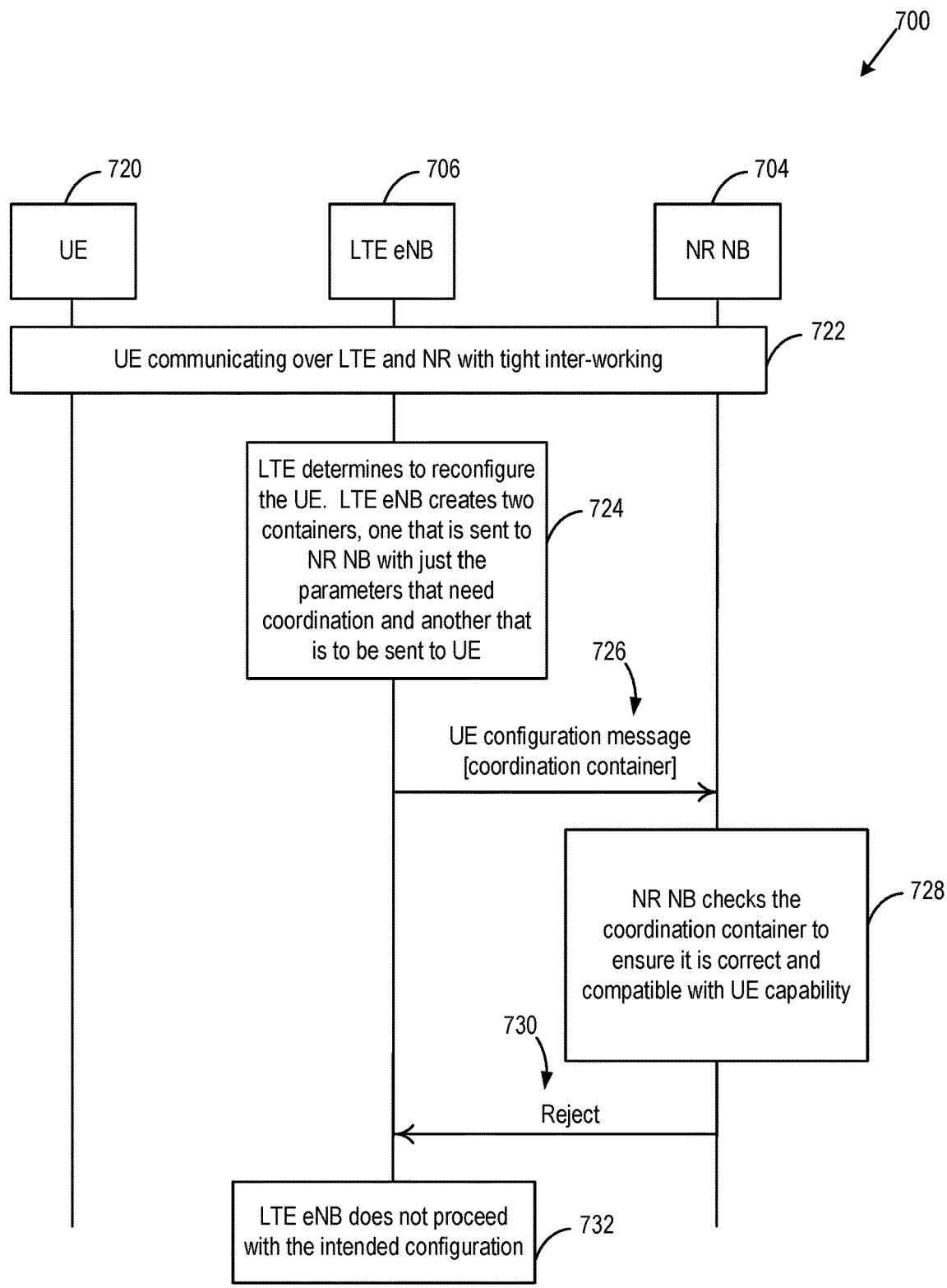
FIG. 7 is a communication flow diagram illustrating unsuccessful RRC configuration coordination by an LTE eNB and NR NB according to some embodiments.

FIG. 7 is a communication flow diagram illustrating an unsuccessful RRC configuration coordination 700 by an LTE eNB 706 and an NR NB 704. When the LTE eNB 706 determines to reconfigure a UE 720 with parameters that need coordination, it provides a container with those parameters to the NR NB 704 as shown in FIG. 7. In block 724, the LTE eNB 706 determines to reconfigure the UE 720. The LTE eNB 706 creates two containers: a coordination container for the NR NB 704 with coordination parameters, and a UE container for the UE 720. In block 726, the LTE eNB 706 transmits the UE configuration message and the coordination container to the NR NB 704. In block 728, the NR NB 704 verifies the coordination container to ensure it is correct and compatible with the UE capability. In block 730, the NR NB 704 transmits a rejection message (such as a NACK) to the LTE eNB 706. In block 732, the LTE eNB 706 does not proceed with the proposed configuration.

In one embodiment, the RRC used to encode the parameters in the coordination container is the RRC of the other node (that is, if NR is doing the configuration and generating the coordination container, it generates the container as per LTE RRC). The benefit of doing so is that the LTE eNB can implement LTE RRC without NR RRC. This uses a mapping to be defined from NR configuration to the corresponding LTE RRC information elements (IEs).

In one embodiment, a way to avoid an LTE eNB having to implement NR RRC is to use LTE RRC to provide an "equivalent" configuration (as compared to the NR configuration) to allow the eNB to check for capability violation. This equivalent configuration defines a mapping of the NR configuration into an LTE RRC configuration.

Figure 8:
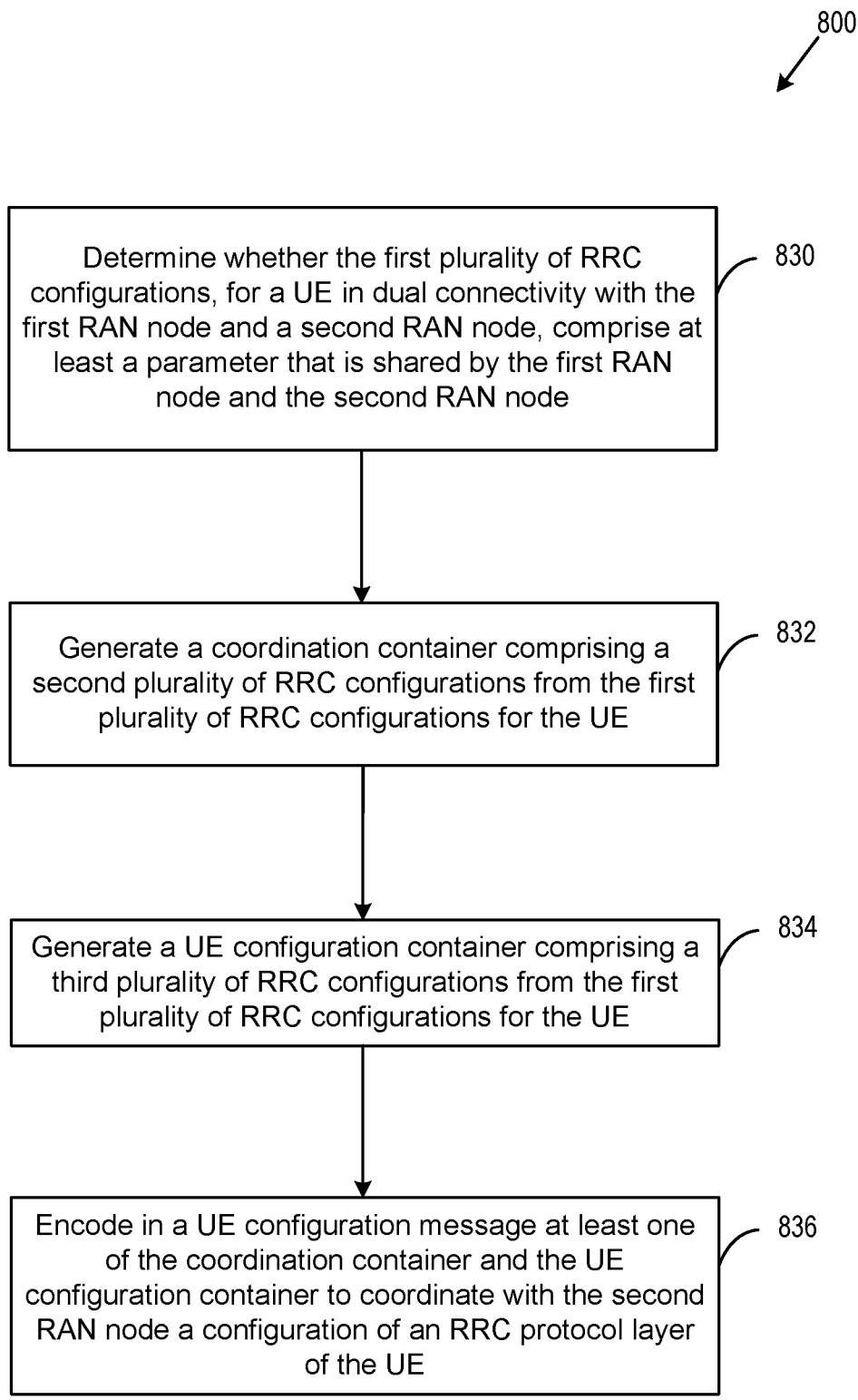
FIG. 8 is a block diagram of a method for coordinating RRC configurations by generating a coordination container according to some embodiments.

FIG. 8 is a block diagram of a method 800 for coordinating RRC configurations by generating a coordination container. The system can be implemented by devices such as those shown in FIGS. 1, 11 and 15, including an NR NB 104, an eLTE eNB 106 and a NextGen Core 102. In block 830, a first RAN node determines whether the first plurality of RRC configurations, for a UE in dual connectivity with the first RAN node and a second RAN node, comprise at least a parameter that is shared by the first RAN node and the second RAN node. In block 832, the first RAN node generates a coordination container comprising a second plurality of RRC configurations from the first plurality of RRC configurations for the UE. In block 834, the first RAN node generates a UE configuration container comprising a third plurality of RRC configurations from the first plurality of RRC configurations for the UE. In block 836, the first RAN node encodes in a UE configuration message at least one of the coordination container and the UE configuration container to coordinate with the second RAN node a configuration of an RRC protocol layer of the UE.

Figure 9:
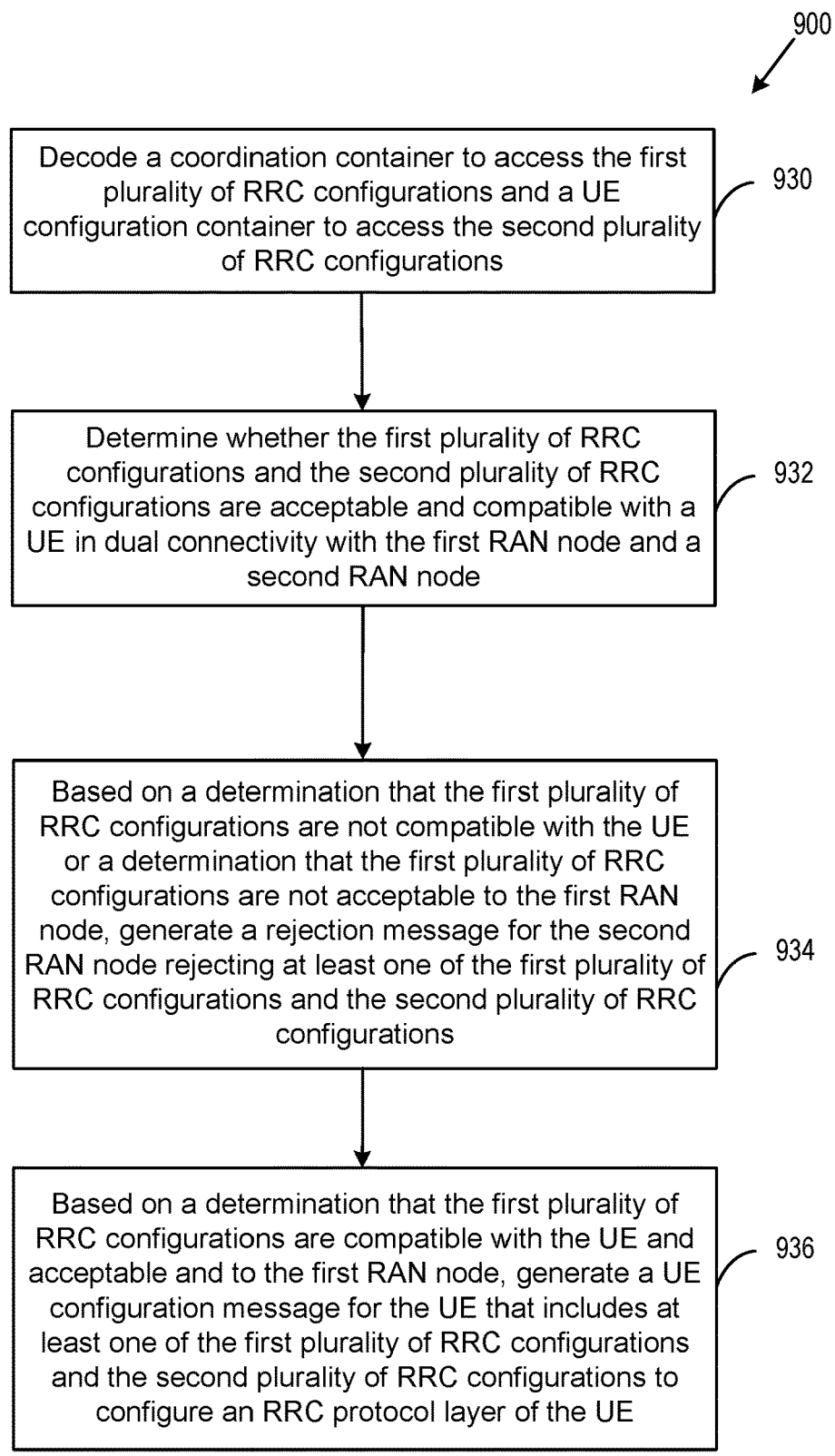
FIG. 9 is a block diagram of a method for coordinating RRC configurations by decoding a coordination container according to some embodiments.

FIG. 9 is a block diagram of a method 900 for coordinating RRC configurations by decoding a coordination container. The system can be implemented by devices such as those shown in FIGS. 1, 11 and 15, including the NR NB 104, the eLTE eNB 106 and the NextGen Core 102. In block 930, a second RAN node decodes a coordination container to access the first plurality of RRC configurations and decodes a UE configuration container to access the second plurality of RRC configurations. In block 932, the second RAN node determines whether the first plurality of RRC configurations and the second plurality of RRC configurations are acceptable and compatible with a UE in dual connectivity with a first RAN node and the second RAN node. In block 934, the second RAN node, based on a determination that the first plurality of RRC configurations are not compatible with the UE or a determination that the first plurality of RRC configurations are not acceptable to the first RAN node, generates a rejection message for the second RAN node rejecting at least one of the first plurality of RRC configurations and the second plurality of RRC configurations. In block 936, based on a determination that the first plurality of RRC configurations are compatible with the UE and acceptable to the first RAN node, the second RAN node generates a UE configuration message for the UE that includes at least one of the first plurality of RRC configurations and the second plurality of RRC configurations to configure an RRC protocol layer of the UE.

Figure 10:
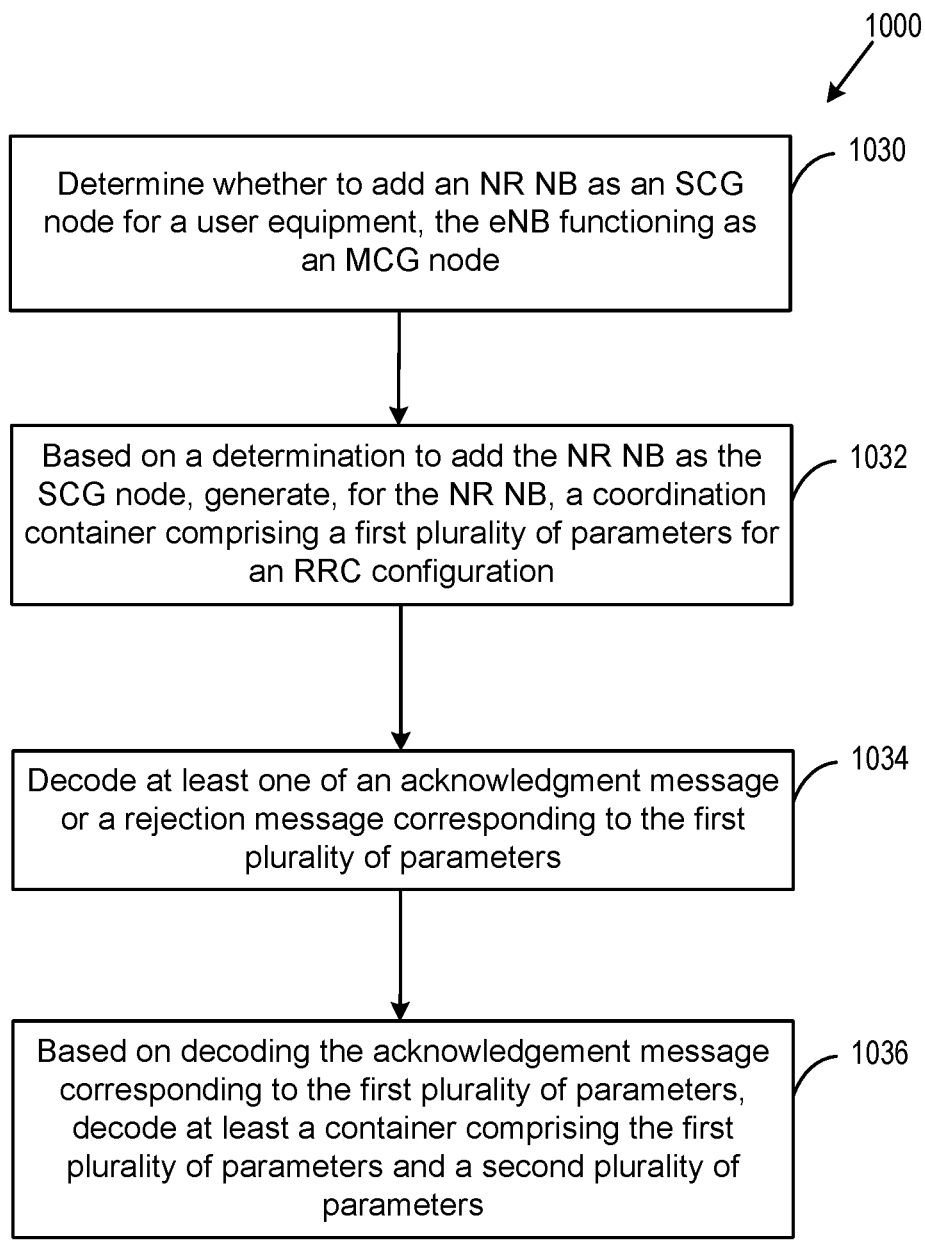
FIG. 10 is a block diagram of a method for coordinating RRC configurations when adding an SCG node according to some embodiments.

FIG. 10 is a block diagram of a method 1000 for coordinating RRC configurations when adding an SCG node. The system can be implemented by devices such as those shown in FIGS. 1, 11 and 15, including the NR NB 104, the eLTE eNB 106 and the NextGen Core 102. In block 1030, an eNB determines whether to add an NR NB as an SCG node for a UE, the eNodeB functioning as an MCG node. In block 1032, based on a determination to add the NR NB as the SCG node, the eNB generates, for the NR NB, a coordination container comprising a first plurality of parameters for an RRC configuration. In block 1034, the eNB decodes at least one of an acknowledgment message or a rejection message corresponding to the first plurality of parameters. In block 1036, based on decoding the acknowledgment message corresponding to the first plurality of parameters, the eNB decodes at least a container comprising the first plurality of parameters and a second plurality of parameters.

Figure 11:
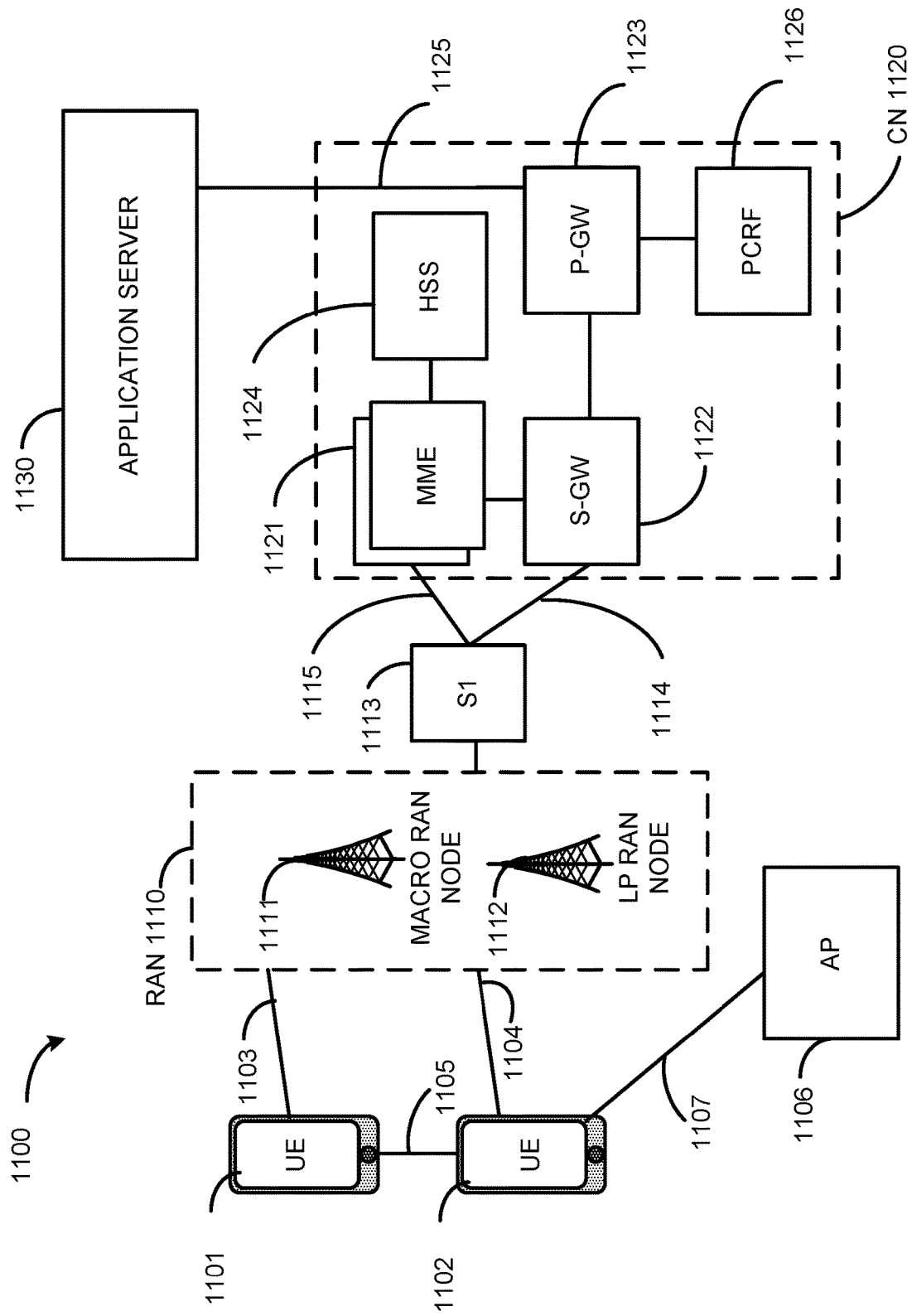
FIG. 11 illustrates an architecture of a system of a network in accordance with some embodiments.

FIG. 11 illustrates an architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110. The RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 1102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 1110 is shown to be communicatively coupled to a core network (CN) 1120 via an S1 interface 1113. In embodiments, the CN 1120 may be an evolved packet core (EPC) network, a NextGen Packet Core (NPC) network, or some other type of CN. In this embodiment the S1 interface 1113 is split into two parts: (i) the S1-U interface 1114, which carries traffic data between the RAN nodes 1111 and 1112 and a serving gateway (S-GW) 1122, and (ii) an S1-mobility management entity (MME) interface 1115, which is a signaling interface between the RAN nodes 1111 and 1112 and MMEs 1121.

In this embodiment, the CN 1120 comprises the MMEs 1121, the S-GW 1122, a Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network and external networks such as a network including the application server 1130 (alternatively referred to as application function (AF)) via an Internet Protocol (IP) interface 1125. Generally, an application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. A Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
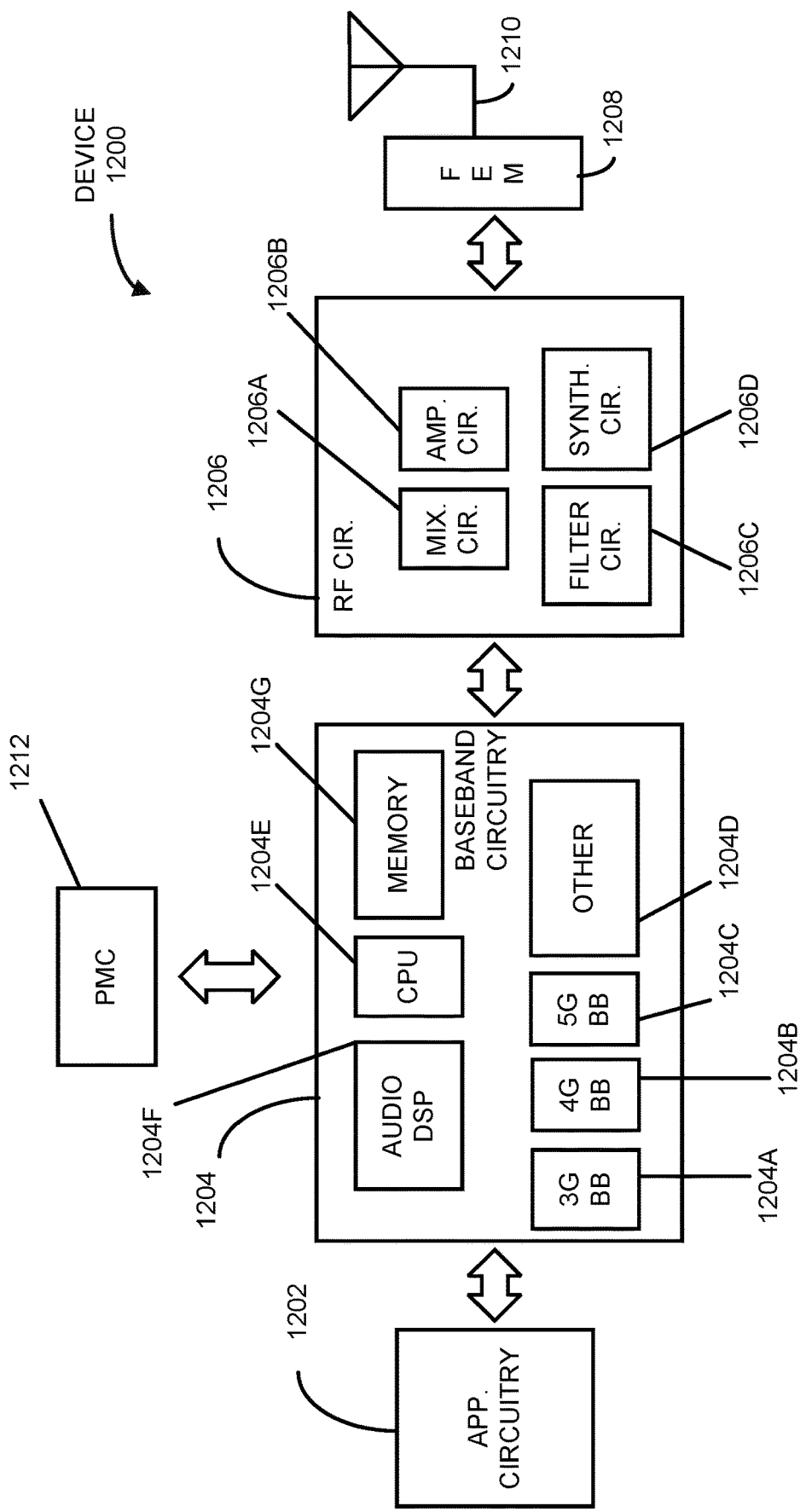
FIG. 12 illustrates example components of a device in accordance with some embodiments.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include fewer elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations or generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc., to facilitate the communication with the wireless network. The RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206A, amplifier circuitry 1206B and filter circuitry 1206C. In some embodiments, the transmit signal path of the RF circuitry 1206 may include filter circuitry 1206C and mixer circuitry 1206A. The RF circuitry 1206 may also include synthesizer circuitry 1206D for synthesizing a frequency for use by the mixer circuitry 1206A of the receive signal path and the transmit signal path. In some embodiments, the mixer circuitry 1206A of the receive signal path may be configured to down-convert RF signals received from the FEM circuitry 1208 based on the synthesized frequency provided by the synthesizer circuitry 1206D. The amplifier circuitry 1206B may be configured to amplify the down-converted signals and the filter circuitry 1206C may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1206A of the receive signal path may comprise passive mixers, although the scope of the embodiments is not limited in this respect.

In some embodiments, the mixer circuitry 1206A of the transmit signal path may be configured to up-convert input baseband signals based on the synthesized frequency provided by the synthesizer circuitry 1206D to generate RF output signals for the FEM circuitry 1208. The baseband signals may be provided by the baseband circuitry 1204 and may be filtered by the filter circuitry 1206C.

In some embodiments, the mixer circuitry 1206A of the receive signal path and the mixer circuitry 1206A of the transmit signal path may include two or more mixers and may be arranged for quadrature downconversion and upconversion, respectively. In some embodiments, the mixer circuitry 1206A of the receive signal path and the mixer circuitry 1206A of the transmit signal path may include two or more mixers and may be arranged for image rejection (e.g., Hartley image rejection). In some embodiments, the mixer circuitry 1206A of the receive signal path and the mixer circuitry 1206A of the transmit signal path may be arranged for direct downconversion and direct upconversion, respectively. In some embodiments, the mixer circuitry 1206A of the receive signal path and the mixer circuitry 1206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206D may be a fractional-N synthesizer or a fractional N/N+1 synthesizer, although the scope of the embodiments is not limited in this respect, as other types of frequency synthesizers may be suitable. For example, the synthesizer circuitry 1206D may be a delta-sigma synthesizer, a frequency multiplier, or a synthesizer comprising a phase-locked loop with a frequency divider.

The synthesizer circuitry 1206D may be configured to synthesize an output frequency for use by the mixer circuitry 1206A of the RF circuitry 1206 based on a frequency input and a divider control input. In some embodiments, the synthesizer circuitry 1206D may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1202 (such as an applications processor) depending on the desired output frequency. In some embodiments, a divider control input (e.g., N) may be determined from a look-up table based on a channel indicated by the application circuitry 1202.

Synthesizer circuitry 1206D of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

The FEM circuitry 1208 may include a receive signal path which may include circuitry configured to operate on RF signals received from one or more antennas 1210, amplify the received signals and provide the amplified versions of the received signals to the RF circuitry 1206 for further processing. The FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM circuitry 1208, or in both the RF circuitry 1206 and the FEM circuitry 1208.

In some embodiments, the FEM circuitry 1208 may include a TX/RX switch to switch between transmit mode and receive mode operation. The FEM circuitry 1208 may include a receive signal path and a transmit signal path. The receive signal path of the FEM circuitry 1208 may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by the RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device 1200 is included in a UE. The PMC 1212 may increase the power conversion efficiency while providing desirable implementation size and heat dissipation characteristics.

FIG. 12 shows the PMC 1212 coupled only with the baseband circuitry 1204. However, in other embodiments, the PMC 1212 may be additionally or alternatively coupled with, and perform similar power management operations for, other components such as, but not limited to, the application circuitry 1202, the RF circuitry 1206, or the FEM circuitry 1208.

In some embodiments, the PMC 1212 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
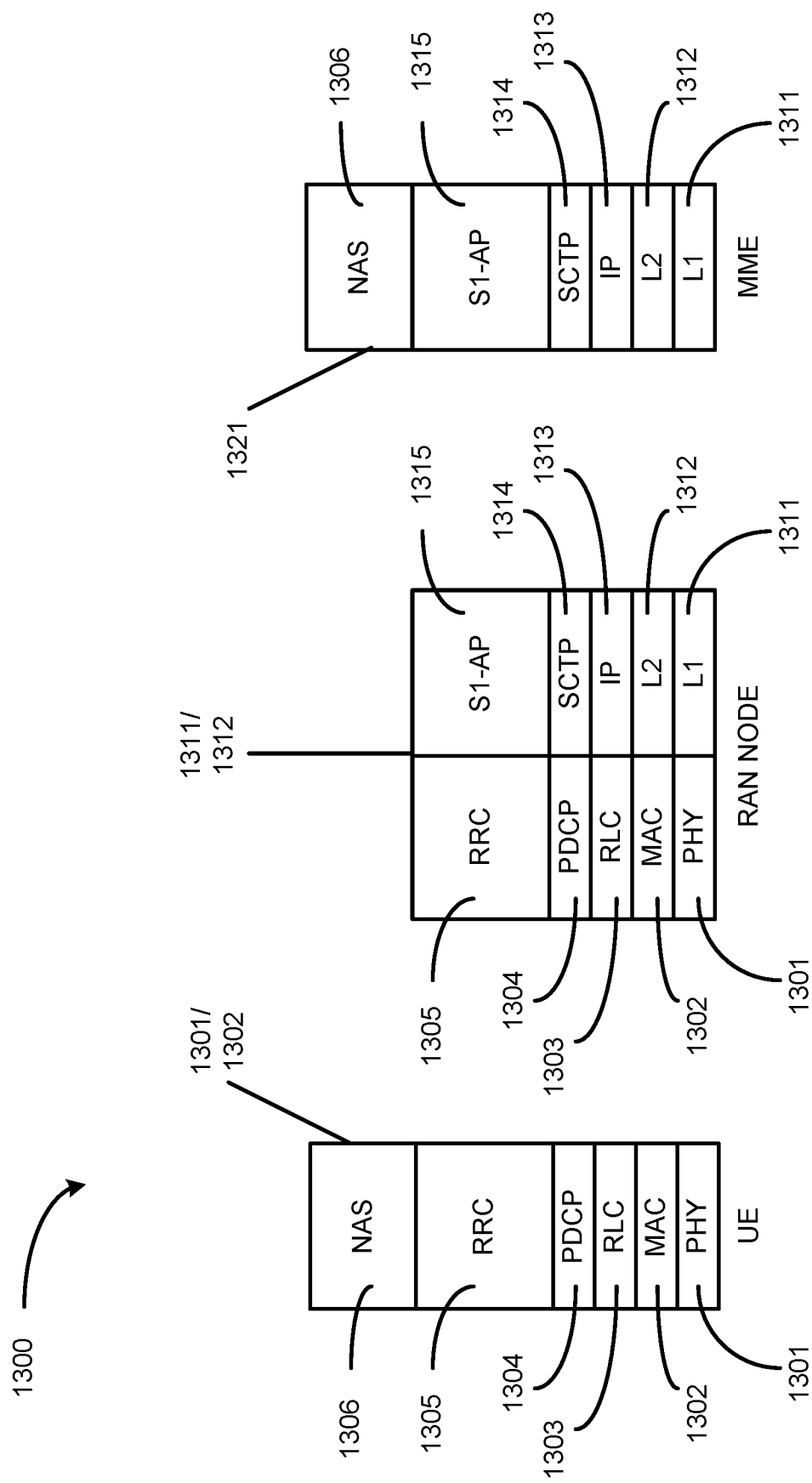
FIG. 13 is an illustration of a control plane protocol stack according to some embodiments.

FIG. 13 is an illustration of a control plane protocol stack in accordance with some embodiments. In this embodiment, a control plane 1300 is shown as a communications protocol stack between the UE 1101 (or alternatively, the UE 1102), the RAN node 1111 (or alternatively, the RAN node 1112), and the MME 1121.

A PHY layer 1301 may transmit or receive information used by the MAC layer 1302 over one or more air interfaces. The PHY layer 1301 may further perform link adaptation or adaptive modulation and coding (AMC), power control, cell search (e.g., for initial synchronization and handover purposes), and other measurements used by higher layers, such as an RRC layer 1305. The PHY layer 1301 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1302 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport xblocks (TB) delivered from the PHY via transport channels, multiplexing MAC SDUs onto TBs, scheduling information reporting, error correction through hybrid automatic repeat request (HARQ), and logical channel prioritization.

An RLC layer 1303 may operate in a plurality of modes of operation, including: Transparent Mode (TM), Unacknowledged Mode (UM), and Acknowledged Mode (AM). The RLC layer 1303 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1303 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1304 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1305 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1101 and the RAN node 1111 may utilize a Uu interface (e.g., an LTE-Uu interface) to exchange control plane data via a protocol stack comprising the PHY layer 1301, the MAC layer 1302, the RLC layer 1303, the PDCP layer 1304, and the RRC layer 1305.

In the embodiment shown, the non-access stratum (NAS) protocols 1306 form the highest stratum of the control plane between the UE 1101 and the MME 1121. The NAS protocols 1306 support the mobility of the UE 1101 and the session management procedures to establish and maintain IP connectivity between the UE 1101 and the P-GW 1123.

The S1 Application Protocol (S1-AP) layer 1315 may support the functions of the S1 interface and comprise Elementary Procedures (EPs). An EP is a unit of interaction between the RAN node 1111 and the CN 1120. The S1-AP layer services may comprise two groups: UE-associated services and non-UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 1314 may ensure reliable delivery of signaling messages between the RAN node 1111 and the MME 1121 based, in part, on the IP protocol, supported by an IP layer 1313. An L2 layer 1312 and an L1 layer 1311 may refer to communication links (e.g., wired or wireless) used by the RAN node and the MME to exchange information.

The RAN node 1111 and the MME 1121 may utilize an S1-MME interface to exchange control plane data via a protocol stack comprising the L1 layer 1311, the L2 layer 1312, the IP layer 1313, the SCTP layer 1314, and the S1-AP layer 1315.

Figure 14:
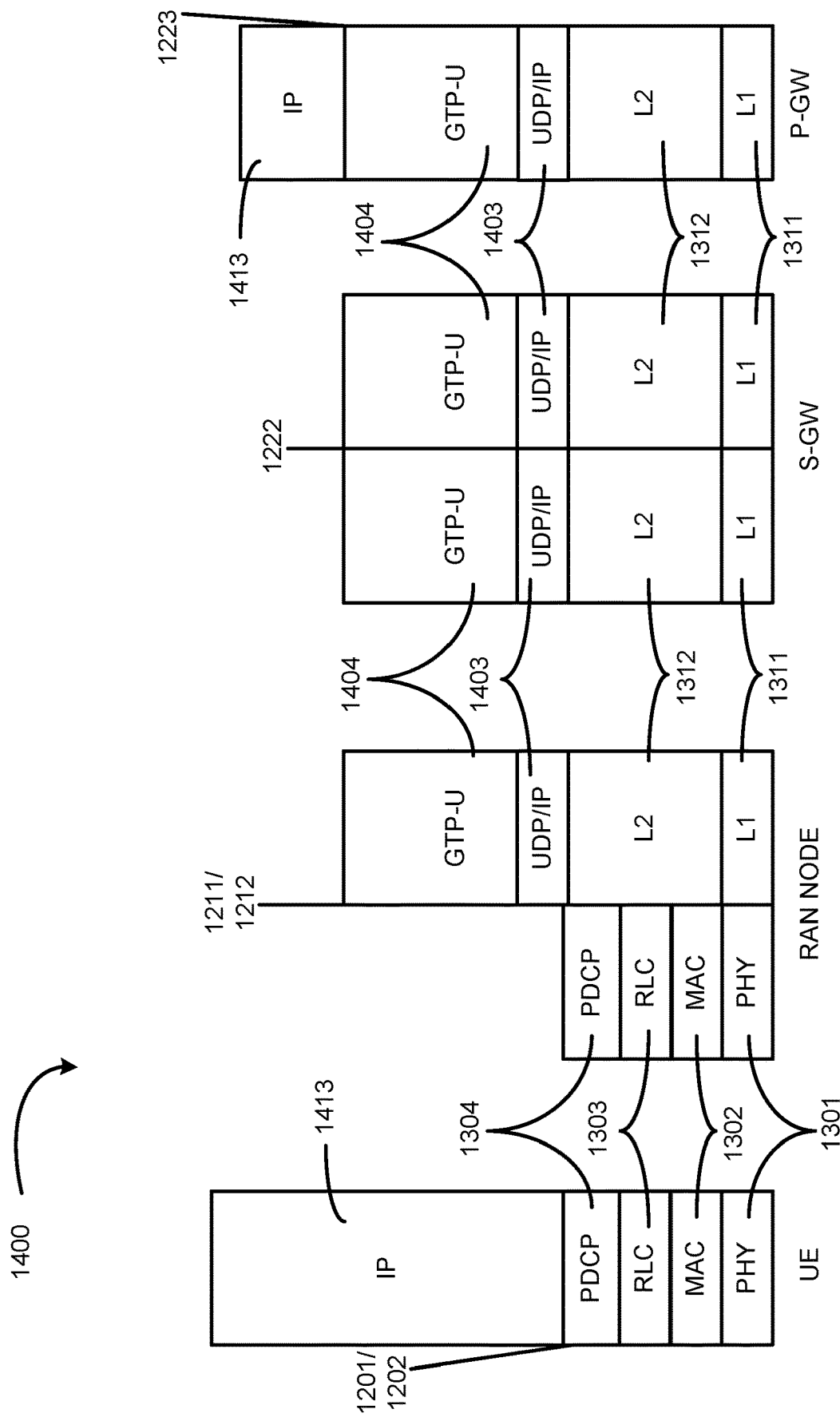
FIG. 14 is an illustration of a user plane protocol stack in accordance with some embodiments

FIG. 14 is an illustration of a user plane protocol stack in accordance with some embodiments. In this embodiment, a user plane 1400 is shown as a communications protocol stack between the UE 1101 (or alternatively, the UE 1102), the RAN node 1111 (or alternatively, the RAN node 1112), the S-GW 1122, and the P-GW 1123. The user plane 1400 may utilize at least some of the same protocol layers as the control plane 1300. For example, the UE 1101 and the RAN node 1111 may utilize a Uu interface (e.g., an LTE-Uu interface) to exchange user plane data via a protocol stack comprising the PHY layer 1301, the MAC layer 1302, the RLC layer 1303, the PDCP layer 1304.

The General Packet Radio Service (GPRS) Tunneling Protocol for a user plane (GTP-U) layer 1404 may be used for carrying user data within the GPRS core network and between the radio access network and the core network. The user data transported can be packets in any of IPv4, IPv6, or PPP formats, for example. A UDP and IP security (UDP/IP) layer 1403 may provide checksums for data integrity, port numbers for addressing different functions at the source and destination, and encryption and authentication on the selected data flows. The RAN node 1111 and the S-GW 1122 may utilize an S1-U interface to exchange user plane data via a protocol stack comprising the L1 layer 1311, the L2 layer 1312, the UDP/IP layer 1403, and the GTP-U layer 1404. The S-GW 1122 and the P-GW 1123 may utilize an S5/S8a interface to exchange user plane data via a protocol stack comprising the L1 layer 1311, the L2 layer 1312, the UDP/IP layer 1403, and the GTP-U layer 1404. As discussed above with respect to FIG. 13, NAS protocols support the mobility of the UE 1101 and the session management procedures to establish and maintain IP connectivity between the UE 1101 and the P-GW 1123.

Figure 15:
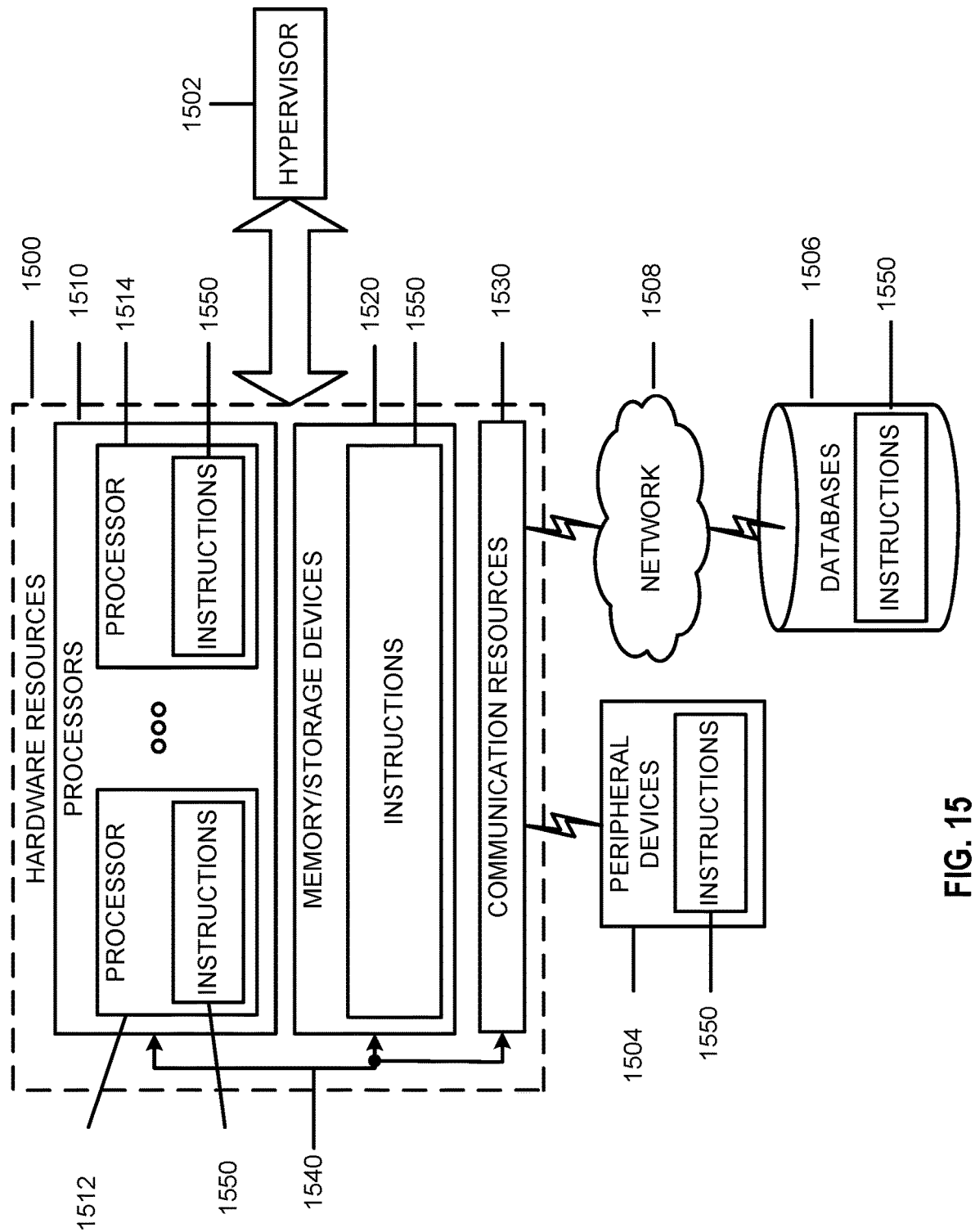
FIG. 15 is a block diagram illustrating components able to read instructions from a machine-readable or computer-readable medium according to some embodiments.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540. For embodiments where node virtualization (e.g., NFV) is utilized, a hypervisor 1502 may be executed to provide an execution environment for one or more network slices/sub-slices to utilize the hardware resources 1500.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514.

The memory/storage devices 1520 may include main memory, disk storage, or any suitable combination thereof. The memory/storage devices 1520 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1530 may include interconnection or network interface components or other suitable devices to communicate with one or more peripheral devices 1504 or one or more databases 1506 via a network 1508. For example, the communication resources 1530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of the processors 1510, the memory/storage devices 1520, the peripheral devices 1504, and the databases 1506 are examples of computer-readable and machine-readable media.

EXAMPLE EMBODIMENTS

Example 1 is an apparatus for a first radio access network (RAN) node comprising an inter-RAN node interface, a memory interface and processor circuitry. The inter-RAN node interface configured for communication with a second RAN node. The memory interface to store or access a set of radio resource control (RRC) parameters in a memory, the set of RRC parameters including a proposed subset of shared RRC parameters shared between the first RAN node and the second RAN node. The processor circuitry configured to: determine a proposed RRC configuration change for a user equipment (UE) in dual connectivity with the first RAN node and the second RAN node includes the proposed subset of shared RRC parameters; generate, for the second RAN node for approval, a coordination container indicating the proposed subset of shared RRC parameters. A processor circuitry also configured to: generate a UE configuration container for the second RAN node to provide to the UE upon approval of the coordination container by the second RAN node, the UE configuration container comprising the proposed RRC configuration change that includes the proposed subset of shared RRC parameters; and encode a UE configuration message to send to the second RAN node that includes the coordination container and the UE configuration container.

Example 2 is the apparatus of Example 1, wherein the coordination container indicates changes to the proposed subset of shared RRC parameters.

Example 3 is the apparatus of Example 2, wherein the coordination container includes the proposed subset of shared RRC parameters.

Example 4 is the apparatus of Example 1, wherein the coordination container comprises a translation of the proposed subset of shared RRC parameters from NR RRC parameters to LTE RRC parameters.

Example 5 is the apparatus of Example 1, wherein the UE configuration container comprises the proposed subset of shared RRC parameters and an unshared subset of the set of radio resource control (RRC) configurations parameters that is not shared between the first RAN node and the second RAN node.

Example 6 is the apparatus of any of Examples 1-5, wherein the first RAN node is a new radio (NR) node B (NB) and the second RAN node is an evolved node B (eNodeB).

Example 7 is the apparatus of any of Examples 1-5, wherein the first RAN node is an eNodeB and the second RAN node is an NR NB.

Example 8 is the apparatus of any of Examples 1-5, wherein the first RAN node is a master cell group (MCG) node and the second RAN node is a secondary cell group (SCG) node.

Example 9 is the apparatus of any of Examples 1-5, wherein the processor circuitry is a baseband processor.

Example 10 is an apparatus for a first radio access network (RAN) node, comprising an inter-RAN node interface, a memory interface and processor circuitry. The inter-RAN node interface configured for communication with a second RAN node. The memory interface to store or access a set of radio resource control (RRC) parameters, a shared subset of the set of RRC parameters shared between the first RAN node and the second RAN node. The processor circuitry configured to: decode a coordination container and a user equipment (UE) configuration container from the second RAN node indicating a proposed RRC configuration change to the UE, the coordination container indicating a proposed subset of the shared subset of set of RRC parameters; determine whether the proposed RRC configuration change violates a UE capability of the UE in dual connectivity with the first RAN node and the second RAN node; when the proposed RRC configuration change is determined to violate the UE capability, generate a rejection message for the second RAN node rejecting the proposed RRC configuration change; and when the proposed RRC configuration change is determined to not violate the UE capability, generate a UE configuration message for the UE that includes the proposed RRC configuration change to configure an RRC protocol layer of the UE.

Example 11 is the apparatus of Example 10, wherein the coordination container is a complement of the UE configuration container and the UE configuration message comprises parameters from both the coordination container and the UE configuration container.

Example 12 is the apparatus of Example 10, wherein the coordination container is a subset of the UE configuration container and the UE configuration container comprises parameters from both the coordination container and the UE configuration container.

Example 13 is the apparatus of any of Examples 10-12, wherein the rejection message further comprises a cause identifier indicating a reason for the determined violated UE capability.

Example 14 is a computer-readable storage medium having stored thereon instructions that stores instructions for execution by a processor to perform operations of an evolved node B (eNB), the operations, when executed by the processor, to perform a method, the method comprising: determining to add a new radio (NR) node B (NB) as a secondary cell group (SCG) node for a user equipment (UE), the eNB functioning as a master cell group (MCG) node; based on a determination to add the NR NB as the SCG node, generating, for the NR NB, a first coordination container comprising a set of shared parameters for a radio resource control (RRC) configuration; encoding an addition request for the NR NB that includes the first coordination container; decoding a configuration message from the NR NB that includes a second coordination container from the NR NB and a UE configuration container; and encoding a UE configuration message to send to the UE, the UE configuration comprising the UE configuration container to configure an RRC protocol layer of the UE.

Example 15 is the computer-readable storage medium of Example 14, wherein the method further comprises: determining to add a second NR NB as a second SCG node for a second UE, the eNB functioning as the MCG node; based on a second determination to add the second NR NB as the second SCG node, generating, for the NR NB, a third coordination container comprising a second set of shared parameters for a second RRC configuration; encoding a second addition request for the second NR NB that includes the third coordination container; and decoding a rejection message from the second NR NB based at least in part on a violation of UE capability.

Example 16 is the computer-readable storage medium of Example 15, wherein the method further comprises to refrain from generating the UE configuration message based at least in part on the rejection message.

Example 17 is the computer-readable storage medium of Example 16, wherein the rejection message includes a cause identifier to identify a reason for a rejection of at least one of the second set of shared parameters.

Example 18 is the computer-readable storage medium of Example 17, wherein the method further comprises encoding for the NR NB, a follow-up second addition request with a follow-up coordination container comprising a third set of shared parameters based at least on corrections to the second set of shared parameters that were rejected and the cause identifier.

Example 19 is the computer-readable storage medium of Example 14, wherein the UE configuration container comprises a combination of parameters from the first coordination container and the second coordination container.

Example 20 is the computer-readable storage medium of any of Examples 14-19, wherein the method further comprises: generating a third coordination container for a RRC reconfiguration of the UE, the third coordination container comprising shared RRC parameters between the LTE eNB and the NR NB; encoding the third coordination container in a message for the NR NB; receiving an acknowledgement message from the NR NB; and encoding a second UE configuration message that includes a second UE configuration container that includes the shared RRC parameters and additional parameters that are not shared between the LTE eNB and the NR NB.

Example 21 is a method of coordination between a evolved Node B (eNB) and a new radio (NR) node B (NB), the method comprising: determining to add a NR NB as a secondary cell group (SCG) node for a user equipment (UE), the eNB functioning as a master cell group (MCG) node; based on a determination to add the NR NB as the SCG node, generating, for the NR NB, a first coordination container comprising a set of shared parameters for a radio resource control (RRC) configuration; encoding an addition request for the NR NB that includes the first coordination container; decoding a configuration message from the NR NB that includes a second coordination container from the NR NB and a UE configuration container; and encoding a UE configuration message to send to the UE, the UE configuration comprising the UE configuration container to configure an RRC protocol layer of the UE.

Example 22 is the method of Example 21, wherein the method further comprises: determining to add a second NR NB as a second SCG node for a second UE, the eNB functioning as the MCG node; based on a second determination to add the second NR NB as the second SCG node, generating, for the NR NB, a third coordination container comprising a second set of shared parameters for a second RRC configuration; encoding a second addition request for the second NR NB that includes the third coordination container; and decoding a rejection message from the second NR NB based at least in part on a violation of UE capability.

Example 23 is the method of Example 22, wherein the method further comprises to refrain from generating the UE configuration message based at least in part on the rejection message.

Example 24 is the method of Example 23, wherein the rejection message includes a cause identifier to identify a reason for a rejection of at least one of the second set of shared parameters.

Example 25 is the method of Example 24, wherein the method further comprises encoding for the NR NB, a follow-up second addition request with a follow-up coordination container comprising a third set of shared parameters based at least on corrections to the second set of shared parameters that were rejected and the cause identifier.

Example 26 is the method of Example 21, wherein the UE configuration container comprises a combination of parameters from the first coordination container and the second coordination container.

Example 27 is the method of any of Examples 21-26, wherein the method further comprises: generating a third coordination container for a RRC reconfiguration of the UE, the third coordination container comprising shared RRC parameters between the LTE eNB and the NR NB; encoding the third coordination container in a message for the NR NB; receiving an acknowledgement message from the NR NB; and encoding a second UE configuration message that includes a second UE configuration container that includes the shared RRC parameters and additional parameters that are not shared between the LTE eNB and the NR NB.

Example 28 is an apparatus of an evolved Node B (eNB) for coordinating with a new radio (NR) node B (NB), the apparatus comprising: means for determining to add a NR NB as a secondary cell group (SCG) node for a user equipment (UE), the eNB functioning as a master cell group (MCG) node; means for based on a determination to add the NR NB as the SCG node, generating, for the NR NB, a first coordination container comprising a set of shared parameters for a radio resource control (RRC) configuration; means for encoding an addition request for the NR NB that includes the first coordination container; means for decoding a configuration message from the NR NB that includes a second coordination container from the NR NB and a UE configuration container; and means for encoding a UE configuration message to send to the UE, the UE configuration comprising the UE configuration container to configure an RRC protocol layer of the UE.

ADDITIONAL EXAMPLES

Additional Example 1 is an LTE and NR network operating in tight-interworking, where LTE or NR NB needs to configure the UE, where the said NB generates two containers with RRC configuration for the UE.

Additional Example 2 is according to Additional Example 1, where the information in one of the containers is relevant for coordination of the LTE and NR configurations.

Additional Example 3 is according to Additional Example 2, where the coordination is for purposes of ensuring the UE capability is not violated.

Additional Example 4 is according to Additional Example 2 or 3, where the information in said container is a duplicate of the information in the other container that contains the UE configuration that is sent to the UE.

Additional Example 5 is according to Additional Example 2 or 3, where the information in said container is a complement of the information in the other container that contains the UE configuration that is sent to the UE such that both containers need to be sent to the UE to make up the full UE configuration.

Additional Example 6 is according to Additional Example 3, where the receiving NB of the said container checks the information in the container with its configuration of the UE to ensure that the confirmation is valid.

Additional Example 7 is according to Additional Example 3, where the receiving NB of the said container checks the information in the container to ensure that it understands and comprehends all of the information in the container to ensure that the two nodes are compatible in terms of the receiving NB's capabilities.

Additional Example 8 is according to Additional Example 3, 6 or 7, where the receiving node sends a reject message if the information in the said container is not compatible.

Additional Example 9 is according to Additional Example 5, where the UE is capable of receiving both said containers and puts together the information in the said containers to generate the full UE configuration.

Various techniques, or certain aspects or portions thereof, may take the form of program code (i.e., instructions) embodied in tangible media, such as floppy diskettes, CD-ROMs, hard drives, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNodeB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations of embodiments.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

The invention claimed is:

1. An apparatus for a first radio access network (RAN) node using a first radio access technology (RAT) comprising:
an inter-RAN node interface configured for communication with a second RAN node using a second RAT;
a memory interface to store or access a set of radio resource control (RRC) parameters in a memory, the set of RRC parameters including a proposed subset of shared RRC parameters shared between the first RAN node and the second RAN node; and
processor circuitry configured to:
determine a proposed RRC configuration change for a user equipment (UE) in dual connectivity with the first RAN node and the second RAN node that includes the proposed subset of shared RRC parameters;
generate, for the second RAN node for approval, a coordination container indicating the proposed subset of shared RRC parameters;
generate a UE configuration container for the second RAN node to provide to the UE upon approval of the coordination container by the second RAN node, the UE configuration container comprising the proposed RRC configuration change that includes the proposed subset of shared RRC parameters; and
encode a UE configuration message to send to the second RAN node that includes the coordination container and the UE configuration container;
wherein the coordination container comprises a translation of the proposed subset of shared RRC parameters between NR RRC parameters and LTE RRC parameters.

2. The apparatus of claim 1, wherein the coordination container indicates changes to the proposed subset of shared RRC parameters.

3. The apparatus of claim 2, wherein the coordination container includes the proposed subset of shared RRC parameters.

4. The apparatus of claim 1, wherein the UE configuration container comprises the proposed subset of shared RRC parameters and an unshared subset of the set of radio resource control (RRC) configurations parameters that is not shared between the first RAN node and the second RAN node.

5. The apparatus of claim 1, wherein the first RAN node is a new radio (NR) node B (NB) and the second RAN node is an evolved node B (eNodeB).

6. The apparatus of claim 1, wherein the first RAN node is an eNodeB and the second RAN node is an NR NB.

7. The apparatus of claim 1, wherein the first RAN node is a master cell group (MCG) node and the second RAN node is a secondary cell group (SCG) node.

8. The apparatus of claim 1, wherein the processor circuitry is a baseband processor.

9. An apparatus for a first radio access network (RAN) node using a first radio access technology (RAT), comprising:
an inter-RAN node interface configured for communication with a second RAN node using a second RAT;
a memory interface to store or access a set of radio resource control (RRC) parameters, a shared subset of the set of RRC parameters shared between the first RAN node and the second RAN node; and
processor circuitry configured to:
decode a coordination container and a user equipment (UE) configuration container from the second RAN node indicating a proposed RRC configuration change to the UE, the coordination container indicating a proposed subset of the shared subset of the set of RRC parameters, wherein the coordination container comprises a translation of the proposed subset of the shared subset of the set of RRC parameters between NR RRC parameters and LTE RRC parameters;

determine whether the proposed RRC configuration change violates a UE capability of the UE in dual connectivity with the first RAN node and the second RAN node;

when the proposed RRC configuration change is determined to violate the UE capability, generate a rejection message for the second RAN node rejecting the proposed RRC configuration change; and when the proposed RRC configuration change is determined to not violate the UE capability, generate a UE configuration message for the UE that includes the proposed RRC configuration change to configure an RRC protocol layer of the UE.

10. The apparatus of claim 9, wherein the coordination container is a complement of the UE configuration container and the UE configuration message comprises parameters from both the coordination container and the UE configuration container.

11. The apparatus of claim 9, wherein the coordination container is a subset of the UE configuration container and the UE configuration container comprises parameters from both the coordination container and the UE configuration container.

12. The apparatus of claim 9, wherein the rejection message further comprises a cause identifier indicating a reason for the determined violated UE capability.

13. A non-transitory computer-readable storage medium having stored thereon instructions for execution by a processor to perform operations of an evolved node B (eNB), the operations, when executed by the processor, to perform a method, the method comprising:

determining to add a new radio (NR) node B (NB) as a secondary cell group (SCG) node for a user equipment (UE), the eNB functioning as a master cell group (MCG) node;

based on a determination to add the NR NB as the SCG node, generating, for the NR NB, a first coordination container comprising a set of shared parameters for a radio resource control (RRC) configuration, wherein the first coordination container comprises a translation of the set of shared parameters between NR RRC parameters and LTE RRC parameters;

encoding an addition request for the NR NB that includes the first coordination container;

decoding a configuration message from the NR NB that includes a second coordination container from the NR NB and a UE configuration container; and encoding a UE configuration message to send to the UE, the UE configuration comprising the UE configuration container to configure an RRC protocol layer of the UE;

wherein the UE configuration container comprises a combination of parameters from the first coordination container and the second coordination container.

14. The non-transitory computer-readable storage medium of claim 13, wherein the method further comprises:

determining to add a second NR NB as a second SCG node for a second UE, the eNB functioning as the MCG node;

based on a second determination to add the second NR NB as the second SCG node, generating, for the NR NB, a third coordination container comprising a second set of shared parameters for a second RRC configuration;

encoding a second addition request for the second NR NB that includes the third coordination container; and decoding a rejection message from the second NR NB based at least in part on a violation of UE capability.

15. The non-transitory computer-readable storage medium of claim 14, wherein the method further comprises to refrain from generating the UE configuration message based at least in part on the rejection message.

16. The non-transitory computer-readable storage medium of claim 15, wherein the rejection message includes a cause identifier to identify a reason for a rejection of at least one of the second set of shared parameters.

17. The non-transitory computer-readable storage medium of claim 16, wherein the method further comprises encoding for the NR NB, a follow-up second addition request with a follow-up coordination container comprising a third set of shared parameters based at least on corrections to the second set of shared parameters that were rejected and the cause identifier.

18. The non-transitory computer-readable storage medium of claim 13, wherein the method further comprises:

generating a third coordination container for a RRC reconfiguration of the UE, the third coordination container comprising shared RRC parameters between the LTE eNB and the NR NB;

encoding the third coordination container in a message for the NR NB;

receiving an acknowledgement message from the NR NB; and encoding a second UE configuration message that includes a second UE configuration container that includes the shared RRC parameters and additional parameters that are not shared between the LTE eNB and the NR NB.

\* \* \* \* \*